(12) United States Patent
Kim et al.

(10) Patent No.: US 8,503,505 B2
(45) Date of Patent: Aug. 6, 2013

(54) APPARATUS AND METHOD FOR TRANSMITTING/RECEIVING DATA IN A COMMUNICATION SYSTEM

(75) Inventors: Jeongchang Kim, Daejeon (KR); Sung-Ik Park, Daejeon (KR); Heung-Mook Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 313 days.

(21) Appl. No.: 13/105,877

(22) Filed: May 11, 2011

(65) Prior Publication Data

US 2011/0280285 A1    Nov. 17, 2011

(51) Int. Cl.
*H04B 1/707*    (2011.01)

(52) U.S. Cl.
USPC ............................ 375/142; 375/146; 375/150

(58) Field of Classification Search
USPC .................. 375/142, 146, 150, 259, 295, 343
See application file for complete search history.

(56) References Cited

U.S. PATENT DOCUMENTS

| | | | |
|---|---|---|---|
| 7,307,666 B2 | 12/2007 | Wu et al. | |
| 2006/0217088 A1* | 9/2006 | Nagaoka et al. | 455/127.1 |
| 2006/0268673 A1 | 11/2006 | Roh et al. | |
| 2009/0175379 A1 | 7/2009 | Rubin et al. | |
| 2010/0040117 A1* | 2/2010 | Lawrow | 375/150 |
| 2011/0280209 A1* | 11/2011 | Wegener | 370/329 |

FOREIGN PATENT DOCUMENTS

| | | |
|---|---|---|
| JP | 2001-136087 A | 5/2001 |
| KR | 2006-0110426 A1 | 10/2006 |
| KR | 2009-0097611 A | 9/2009 |
| KR | 2010-0056170 A | 5/2010 |

OTHER PUBLICATIONS

X. Wang et al., "Robust Data Transmission Using the Transmitter Identification Sequences in ATSC DTV Signals", IEEE Trans. Consumer Electronics, vol. 51, No. 1, pp. 41-47, Feb. 2005.

* cited by examiner

*Primary Examiner* — Don N Vo
(74) *Attorney, Agent, or Firm* — Rabin & Berdo, P.C.

(57) ABSTRACT

An apparatus and a method for transmitting/receiving data generate main service data of broadcasting data, generate additional data of the broadcasting data, transform the additional data into a parallel type, generate pseudo-random noise sequences as a spreading code of the additional data, select polarities of the pseudo-random noise sequences using any one additional data bits in the additional data in the transformed parallel type, map the remaining additional data bits excluding the one additional data bit from the additional data in the transformed parallel type to a single sequence, multiply a single sequence to which the remaining additional data bits are mapped by pseudo-noise sequences of which the polarities are selected, control mean power of the additional data multiplied by the sequences, couple the additional data of which the mean power is controlled with the main service data, and then, transmit the broadcasting data.

18 Claims, 5 Drawing Sheets

APPARATUS AND METHOD FOR TRANSMITTING/RECEIVING DATA IN A COMMUNICATION SYSTEM

CROSS-REFERENCE TO RELATED APPLICATIONS

The present application claims priority of Korean Patent Application No. 10-2010-0044613, filed on May 12, 2010, which is incorporated herein by reference in its entirety.

BACKGROUND OF THE INVENTION

1. Field of the Invention

Exemplary embodiments of the present invention relate to a communication system, and more particularly, to an apparatus and a method for transmitting/receiving additional data of broadcasting data using transmitter identification signals (TxID) in a digital broadcasting system.

2. Description of Related Art

Today, research into a technology capable of providing services having various qualities of services (QoSs) to users at a high transmission rate has been actively made in a communication system. As the digital broadcasting system that is an example of the communication system, methods for transmitting restricted resources such as various types of video and audio data, or the like, at high speed have been proposed. In other words, in the digital broadcasting system, various methods for improving transmission efficiency of broadcasting data including various types of video and audio data, or the like, have been proposed.

Meanwhile, in the digital broadcasting system, technologies for transmitting high definition-digital TV signals using a network configured to include multiple transmitters have actively researched so as to provide various types of high-definition digital broadcasting to users. As a method of configuring a network using the multiple transmitters, there are a multiple frequency network (MFN) and a single frequency network (SFN). The SFN that configures a network between the multiple transmitters using a single frequency is very efficient in terms of frequency use, as compared with the MFN.

In the digital broadcasting system, the SFN is configured so as to be able to increase use efficiency of frequency and receive digital broadcasting signals even on the move and an indoor multi-path environment but may cause interference due to transmitting signals from adjacent transmitters. In order to resolve the above problem, a method for transmitting TxID signals has been suggested. Herein, the digital broadcasting system transmits the TxID signals so as to minimize the transmitting signal interference between the adjacent transmitters as described above by identifying transmitters within the SFN in the receiver. In this case, the digital broadcasting system transmits and receives broadcasting data so as to be able to identify the transmitters within the SFN, that is, transmits and receives the broadcasting data together with the TxID signals by generating spreading codes for each transmitter in consideration of distributed transmission of broadcasting data so as to transmit the TxID and then, inserting the spreading codes for each transmitter into data symbols of broadcasting data for each transmitter by a watermarking method and transmitting and receiving the inserted broadcasting data.

However, in the current digital broadcasting system, a method for transmitting and receiving the TxID signals capable of identifying each transmitter so as to minimize the interference due to the transmitting signals from the adjacent transmitters as described above is nothing but schematically described and a method for transmitting and receiving broadcasting data and additional data of the broadcasting data so as to meet demands of users wishing to receive various types of high definition broadcasting data, in particular, a detailed method for transmitting and receiving the additional data using the TxID has not yet been suggested.

Therefore, a need exists for a method for transmitting and receiving the broadcasting data and the additional data using the TxID so as to improve the use efficiency of frequency while minimizing the transmitting signal interference between the adjacent transmitters in the communication system, for example, the digital broadcasting system.

SUMMARY OF THE INVENTION

An embodiment of the present invention is directed to provide an apparatus and a method for transmitting and receiving data in a communication system.

Another embodiment of the present invention is directed to provide an apparatus and a method for transmitting and receiving data in a communication system capable of transmitting and receiving broadcasting data and additional data of the broadcasting data.

Another embodiment of the present invention is directed to provide an apparatus and a method for transmitting and receiving data in a communication system, which transmits and receives additional data of broadcasting data using transmitter identification signals for identifying transmitters within a single frequency network.

Another embodiment of the present invention is directed to provide an apparatus and a method for transmitting and receiving data in a communication system, which transmits and receives broadcasting data and additional data using transmitter identification signals so as to enable a digital broadcasting system to improve use efficiency of frequency while minimizing transmitting signal interference between adjacent transmitters.

In accordance with an embodiment of the present invention, an apparatus for transmitting data in a communication system includes: a first generator configured to generate main service data of broadcasting data; a second generator configured to generate additional data of the broadcasting data; a transformer configured to transform the addition data into a parallel type; a sequence generator configured to generate pseudo-random noise sequences as a spreading code of the additional data; a selector configured to select polarities of the pseudo-random noise sequences using any one additional data bits in the additional data in the transformed parallel type; a sequence mapper configured to map the remaining additional data bits excluding the one additional data bit from the additional data in the transformed parallel type to a single sequence; a multiplier configured to multiply a single sequence to which the remaining additional data bits are mapped by pseudo-noise sequences of which the polarities are selected; a controller configured to control mean power of the additional data multiplied by the sequences; a coupler configured to couple the additional data of which the mean power is controlled with the main service data as the broadcasting data; and a transmitter configured to transmit the broadcasting data.

In accordance with another embodiment of the present invention, an apparatus for receiving data in a communication system includes: a despreader configured to multiply and despread pseudo-random noise sequences as a spreading code by additional data of broadcasting data; a correlator configured to correlate the despread additional data with a plurality of sequences to calculate a plurality of correlation values; a calculator configured to calculate absolute values of the correlation values, respectively; a first detector configured to select indexes of maximum values among the absolute values and output additional data bits corresponding to the indexes; a second detector configured to detect polarities of the correlation values corresponding to the indexes from the plurality of correlation values and output the additional data bits corresponding to the detected polarities; and a transformer configured to transform additional data bits output from the first detector and the second detector in to additional data in a serial type and recover the additional data of the broadcasting data.

In accordance with another embodiment of the present invention, a method for transmitting data in a communication system includes: generating main service data of broadcasting data and additional data of the broadcasting data and transforming the additional data into a parallel type; generating pseudo-random noise sequences as a spreading code of the additional data; selecting polarities of the pseudo-random noise sequences using any one additional data bits in the additional data in the transformed parallel type; mapping the remaining additional data bits excluding the one additional data bit from the additional data in the transformed parallel type to a single sequence; multiplying a single sequence to which the remaining additional data bits are mapped by pseudo-noise sequences of which the polarities are selected; controlling mean power of the additional data multiplied by the sequences; coupling the additional data of which the mean power is controlled with the main service data and then, transmitting the broadcasting data.

In accordance with an embodiment of the present invention, a method for receiving data in a communication system includes: multiplying and despreading pseudo-random noise sequences as a spreading code by additional data of broadcasting data; after correlating the despread additional data with a plurality of sequences to calculate a plurality of correlation values and calculating absolute values of the correlation values, respectively, selecting indexes of maximum values among the absolute values to detect additional data bits corresponding to the indexes, detecting polarities of the correlation values corresponding to the indexes from the plurality of correlation values and detecting the additional data bits corresponding to the detected polarities; and transforming the respective detected additional data bits into one additional data in a serial type to recover the additional data of the broadcasting data.

DESCRIPTION OF SPECIFIC EMBODIMENTS

Exemplary embodiments of the present invention will be described below in more detail with reference to the accompanying drawings. Only portions needed to understand an operation in accordance with exemplary embodiments of the present invention will be described in the following description. It is to be noted that descriptions of other portions will be omitted so as not to make the subject matters of the present invention obscure.

Exemplary embodiments of the present invention propose an apparatus and a method for transmitting and receiving broadcasting data and additional data of the broadcasting data in a communication system, for example, a digital broadcasting system. In the exemplary embodiments of the present invention, the digital broadcasting system transmits and receives the additional data of the broadcasting data using transmitter identification (TxID) signals for identifying a plurality of transmitters within a network configured to include multiple transmitters, for example, a single frequency network (SFN) so as to provide various types of high definition digital broadcasting to users.

In addition, the exemplary embodiments of the present invention transmit and receive the additional data of the broadcasting data using the TxID signals transmitted to minimize the transmitting signal interference between the adjacent transmitters due to the network configured to include the multiple transmitters, for example, the SFN so as to improve the data transmission efficiency, improve the use efficiency of available frequency, and minimize the transmitting signal interference in the digital broadcasting system, such that they can smoothly transmit and receive the large-capacity broadcasting data and the additional data of the broadcasting data so as to meet demands of users wishing to receiving various types of high-definition digital broadcasting, thereby providing various types of high-definition digital broadcasting to the users.

Further, the exemplary embodiments of the present invention propose a method for identifying the plurality of transmitters within the SFN using the TxID signals and improving the transmission efficiency of the broadcasting data, in particular, the additional data in the digital broadcasting system. The exemplary embodiments of the present invention transmit and receive the additional data using the TxID signals and transmit and receive sequences corresponding to values of input bits by transforming polarities of pseudo-random noise sequences and mapping a plurality of bits to a plurality of sequences, thereby improving the data transmission efficiency. An apparatus for transmitting data in a communication system in accordance with an exemplary embodiment of the present invention will be described in more detail with reference to FIG. 1.

Figure 1:
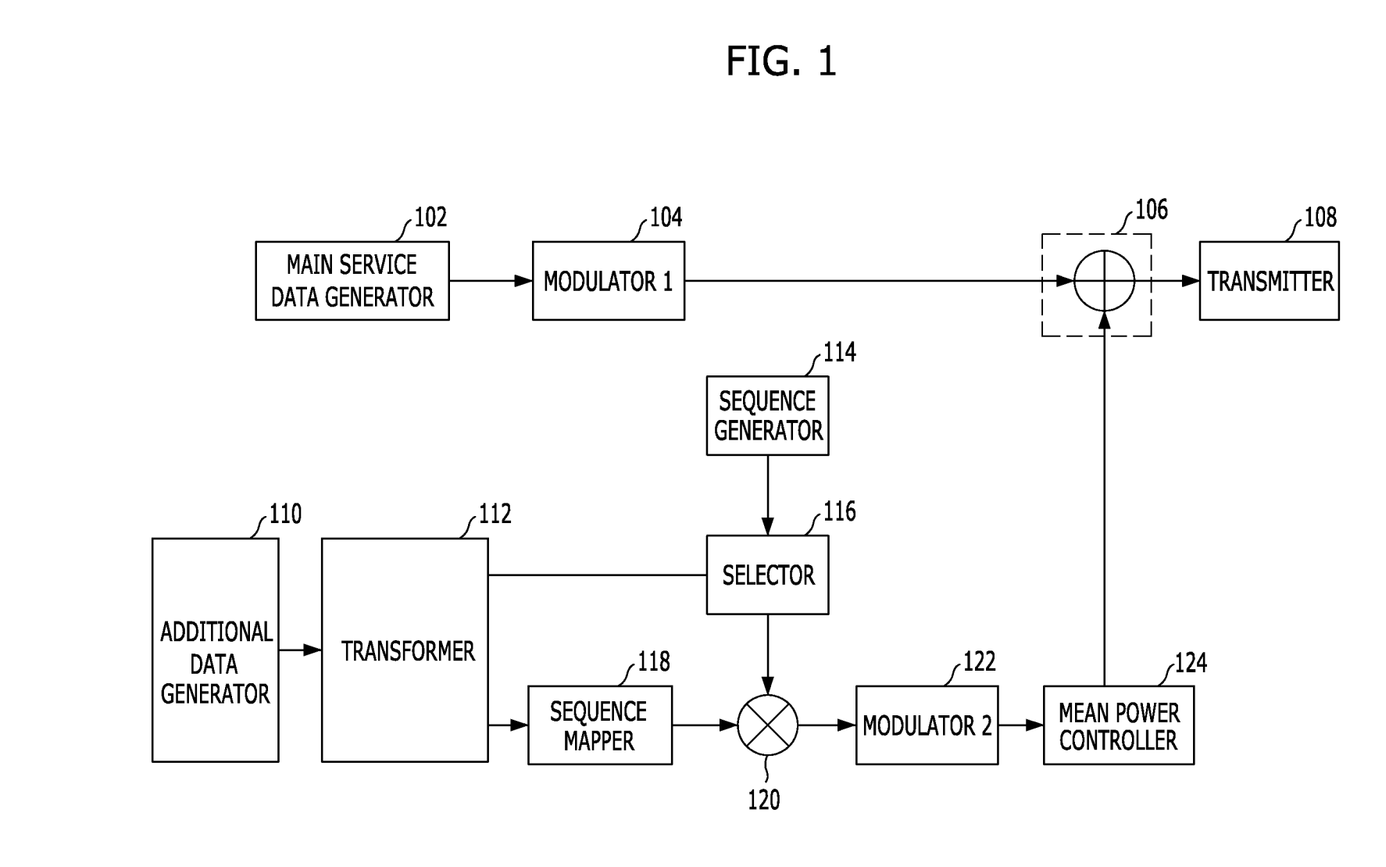
FIG. 1 is a diagram schematically illustrating a structure of a transmitting apparatus in a communication system in accordance with an exemplary embodiment of the present invention.

FIG. 1 is a diagram schematically illustrating a structure of an apparatus for transmitting data in a communication system in accordance with an exemplary embodiment of the present invention.

Referring to FIG. 1, the apparatus for transmitting data includes a main service data generator 102 configured to generate main service data of broadcasting data for providing various types of high-definition digital broadcasting to users and a modulator 1 104 configured to modulate the main service data. Further, the apparatus for transmitting data includes an additional data generator 110 configured to generate the additional data of the broadcasting data, a transformer 112 configured to transform a serial type of additional data into a parallel type of additional data, a sequence generator 114 configured to generate pseudo-random noise sequences as a spreading code to be used as TxID signals, a selector 116 configured to select polarities of the pseudo-noise sequences using one additional data bit in the additional data transformed into the parallel type, a sequence mapper 118 configured to map the remaining additional data bits excluding one additional data bit from the additional data transformed into the parallel type to a single sequence, a multiplier 120 configured to multiply the pseudo-random noise sequences of which the polarities are selected by a sequence mapped to the single sequence, a modulator 2 122 configured to modulate output data from the multiplier 120, and a mean power controller 124 configured to control mean power of the modulated data. Further, the apparatus for transmitting data includes a coupler 106 configured to couple the modulated main service data with data of which the mean power is controlled and a transmitter 108 configured to transmit the output data from the coupler 106 as the broadcasting data.

The main service data generator 102 generates main service data symbols of the broadcasting data as the main broadcasting services for providing various types of high-definition digital broadcasting to users. In addition, the modulator 1 104 modulates the main service data symbols generated from the main service data generator 102 into a signal in a predetermined frequency band.

The additional data generator 110 generates additional service data symbols of the broadcasting data, that is, additional data as the additional services to be additionally provided in addition to the main broadcasting services provided to the users. In this case, the additional services are provided as the additional broadcasting services in addition to the main service data through the transmission of the additional data, the data services, for example, education, stock, public service, or the like, in addition to the broadcasting, and additional information such as program information by being linked with the main broadcasting services is provided.

The transformer 112 transforms the additional data for the broadcasting data input in the serial type into the additional data in the parallel type, wherein the ($\log_2$ M) additional data in the serial type is transformed into additional data in the parallel data. That is, the transformer 112 outputs the additional data of ($\log_2$ M+1) bits.

The sequence generator 114 generates the pseudo-random noise as the spreading code so as to transmit the additional data using the TxID signals, wherein the spreading code is used as the TxID signals. Further, the selector 116 selects the polarities of the pseudo-random noise sequences using any one additional data bit of the additional data of ($\log_2$ M+1) bits, for example, the first additional data bit. That is, the selector 116 selects the polarities of the pseudo-random noise sequences used as the TxID signal and any one additional data bit in the additional data of ($\log_2$ M+1) bit is used to select the polarity for the pseudo-random noise sequence.

The sequence mapper 118 maps the remaining additional data bits excluding one additional data bit input to the selector 116 in the additional data of ($\log_2$ M+1) bits, for example, the additional data of ($\log_2$ M) bits to one of M sequences. Herein, the sequence mapper 118 may use a Walsh sequence as a sequence used for mapping the remaining additional data bits of ($\log_2$ M) bits and the sequence mapper 118 maps the remaining additional data bits of ($\log_2$ M) bits to a single Walsh sequence. In addition, in the additional data of ($\log_2$ M+1) bits, the remaining additional data bits of ($\log_2$ M) bits are used to determine an amplitude level of the pseudo-random noise sequence.

Further, the sequence mapper 118 may use both an orthogonal sequence and a sequence that does not satisfy orthogonality as a sequence used for mapping to a single sequence. In this case, a length of the sequence mapped by the sequence mapper 118 is equal to or less than a length of the pseudo-random noise sequence generated from the sequence generator 114.

The multiplier 120 multiplies the pseudo-random noise sequences of which the polarities are selected by the selector 116 by the sequence mapped to the single sequence by the sequence mapper 118. In this case, when the length of the sequence mapped by the sequence mapper 118 is shorter than the length of the pseudo-random sequence generated from the sequence generator 114, the multiplier 120 transforms the sequences mapped by the sequence mapper 118 to have the same length as the pseudo-random noise sequences generated from the sequence generator 114 by repeating some of all of the elements configuring the sequence mapped by the sequence mapper 118 and then, multiplies both sequences. That is, the multiplier 120 transforms the pseudo-random noise sequences of which the polarities are selected by the selector 116 so as to have the same as the length of the sequence mapped to the single sequence by the sequence mapper 118 and then, multiplies both sequences. In this case, the multiplier 120 may perform only a sign transformation operation depending on signs of the mapped sequences or the pseudo-random noise sequences of which the polarities are selected. In other words, the multiplier 120 performs the sign transformation operation depending on the signs of the mapped sequences or the pseudo-random noise sequences of which the polarities are selected to output the additional data obtained by multiplying both sequences.

The modulator 2 122 modulates the signal output from the multiplier 120, that is, the additional data into a signal in a predetermined frequency band, for example, a frequency band modulated in the modulator 1 104 or another frequency band. Further, the mean power controller 124 controls the mean power of the additional data modulated in the modulator 2 122.

The coupler 106 couples the main service data modulated in the modulator 1 104 with the additional data of which the mean power is controlled by the mean power controller 124 and thus, outputs the single broadcasting data by coupling the main service data with the additional data. Further, the transmitter 108 transmits the broadcasting data in which the main service data is coupled with the additional data. In this case, the transmitter 108 transforms and transmits the broadcasting data into an RF band.

The apparatus for transmitting data in accordance with the exemplary embodiment of the present invention generates the pseudo-random noise sequences as the spreading code to be used as the TxID signals and selects the polarities of the pseudo-random noise sequences by using one of the plurality of additional data bits and then multiplies the pseudo-random noise sequences of which the polarities are selected by the sequence in which the remaining additional data bits in the plurality of additional data bits are mapped, thereby transmitting the additional data using the TxID signals. In this case, the apparatus for transmitting data transmits the additional data coupled with the main service data as the broadcasting data.

Figure 2:
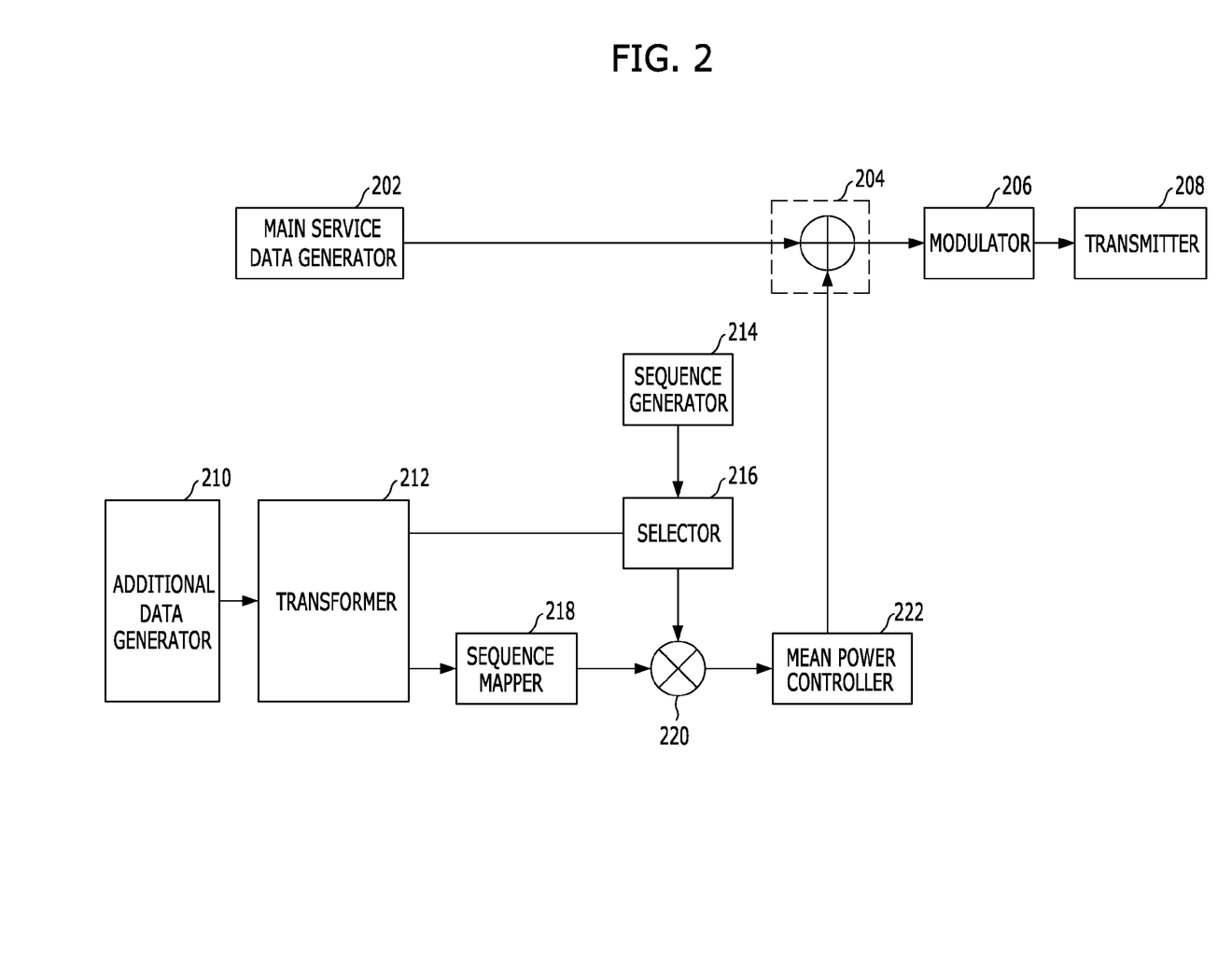
FIG. 2 is a diagram schematically illustrating a structure of an apparatus for transmitting data in a communication system in accordance with another exemplary embodiment of the present invention.

In other words, the apparatus for transmitting data transforms one of the plurality of additional data bits into the polarities of the pseudo-random noise sequences as the spreading code at the time of transmitting the additional data using the TxID signals and maps the remaining additional data bits excluding one additional data bit from the plurality of additional data bits to the plurality of sequences and then transmits the sequences corresponding to the values of the input bits, thereby significantly increasing the data transmission rate of the large-capacity broadcasting data. In addition, the apparatus for transmitting data may modulate the additional data by adding a relatively simple hardware, thereby minimizing the increase in complexity of the system. Referring to FIG. 2, an apparatus for transmitting data in a communication system in accordance with another exemplary embodiment of the present invention will be described in more detail.

FIG. 2 is a diagram schematically illustrating a structure of an apparatus for transmitting data in a communication system in accordance with another exemplary embodiment of the present invention. FIG. 2 schematically illustrates the structure of the apparatus for transmitting data when the modulator 1 104 and the modulator 2 122 are modulated into the signal in the frequency band.

Referring to FIG. 2, the apparatus for transmitting data includes a main service data generator 202 configured to generate the main service data of the broadcasting data for providing various types of high-definition digital broadcasting to users, an additional data generator 210 configured to generate the additional data of the broadcasting data, a transformer 212 configured to transform a serial type of the additional data into a parallel type of the additional data, a sequence generator 214 configured to generate pseudo-random noise sequences as a spreading code to be used as the TxID signals, a selector 216 configured to select the polarities of the pseudo-noise sequences using one additional data bit in the additional data transformed into the parallel type, a sequence mapper 218 configured to map the remaining additional data bits excluding one additional data bit from the additional data transformed into the parallel type to the single sequence, a multiplier 220 configured to multiply the pseudo-random noise sequences of which the polarities are selected by the sequence mapped to the single sequence, and a mean power controller 222 configured to control the mean power of the output data from the multiplier 220. Further, the data transmitting apparatus includes a coupler 204 configured to couple the main service data with the data of which the mean power is controlled and a modulator 206 configured to modulate the output data from the coupler 204, and a transmitter 208 configured to transmit the output data from the modulator 206 as the broadcasting data.

The main service data generator 202 generates the main service data symbols of the broadcasting data as the main broadcasting services for providing various types of high-definition digital broadcasting to users.

The additional data generator 210 generates the additional service data symbols of the broadcasting data, that is, the additional data as the additional services to be additionally provided in addition to the main broadcasting services provided to the users. In this case, the additional services are provided as the additional broadcasting services in addition to the main service data through the transmission of the additional data, the data services, for example, education, stock, public service, or the like, in addition to the broadcasting, and additional information such as program information by being linked with the main broadcasting services is provided.

The transformer 212 transforms the additional data for the broadcasting data input in the serial type into the additional data in the parallel type, wherein the additional data in the serial type is transformed into ($\log_2 M+1$) additional data in the parallel data. That is, the transformer 212 outputs the additional data of ($\log_2 M+1$) bits.

The sequence generator 214 generates the pseudo-random noise as the spreading code so as to transmit the additional data, wherein the spreading code is used as the TxID signals. Further, the selector 216 selects the polarities of the pseudo-random noise sequences using any one additional data bit of the additional data of ($\log_2 M+1$) bits, for example, the first additional data bit. That is, the selector 216 selects the polarities of the pseudo-random noise sequences used as the TxID signals and any one additional data bit in the additional data of ($\log_2 M+1$) bit is used to select the polarities of the pseudo-random noise sequences.

The sequence mapper 218 maps the remaining additional data bits excluding the one additional data bit input to the selector 216 in the additional data of ($\log_2 M+1$) bits, for example, the additional data of ($\log_2 M$) bits to one of M sequences. Herein, the sequence mapper 118 may use a Walsh sequence as a sequence used for mapping the remaining additional data bits of ($\log_2 M$) bits and the sequence mapper 118 maps the remaining additional data bits of ($\log_2 M$) bits to a single Walsh sequence. In addition, in the additional data of ($\log_2 M+1$) bits, the remaining additional data bits of ($\log_2 M$) bits are used to determine an amplitude level of the pseudo-random noise sequence.

Further, the sequence mapper 218 may use both an orthogonal sequence and a sequence that does not satisfy orthogonality as a sequence used for mapping to a single sequence. In this case, a length of the sequence mapped by the sequence mapper 218 is equal to or less than a length of the pseudo-random noise sequence generated from the sequence generator 214.

The multiplier 220 multiplies the pseudo-random noise sequences of which the polarities are selected by the selector 216 by the sequence mapped to the single sequence by the sequence mapper 218. In this case, when the length of the sequence mapped by the sequence mapper 218 is shorter than the length of the pseudo-random sequence generated from the sequence generator 214, the multiplier 220 transforms the sequence mapped by the sequence mapper 218 to have the same length as the pseudo-random noise sequences generated from the sequence generator 214 by repeating some of all of the elements configuring the sequence mapped by the sequence mapper 218 and then, multiplies both sequences. That is, the multiplier 220 transforms the pseudo-random noise sequences of which the polarities are selected by the selector 216 so as to have the same as the length of the sequence mapped to the single sequence by the sequence mapper 218 and then, multiplies both sequences. In this case, the multiplier 220 may perform only a sign transformation operation depending on signs of the mapped sequences or the pseudo-random noise sequences of which the polarities are selected. In other words, the multiplier 220 performs the sign transformation operation depending on the signs of the mapped sequences or the pseudo-random noise sequences of which the polarities are selected to output the additional data obtained by multiplying both sequences.

The mean power controller 222 controls the signal output from the multiplier 220, that is, the mean power of the additional data. The coupler 206 couples the main service data generated from the main service data generator 202 with the additional data of which the mean power is controlled by the mean power controller 222, such that the coupler 206 couples the main service data with the additional data to output the single broadcasting data.

The modulator 206 modulates the broadcasting data coupled in the coupler 206 into the signal in the predetermined frequency band. Further, the transmitter 208 transmits the broadcasting data in which the main service data is coupled with the additional data. In this case, the transmitter 208 transforms and transmits the broadcasting data into an RF band.

The apparatus for transmitting data in accordance with the exemplary embodiment of the present invention generates the pseudo-random noise sequences as the spreading code to be used as the TxID signals and selects the polarities of the pseudo-random noise sequences by using one of the plurality of additional data bits and then multiplies the pseudo-random noise sequences of which the polarities are selected by the sequence in which the remaining additional data bits in the plurality of additional data bits are mapped, thereby transmitting the additional data using the TxID signals. In this case, the apparatus for transmitting data transmits the additional data coupled with the main service data as the broadcasting data.

In other words, the apparatus for transmitting data transforms one of the plurality of additional data bits into the polarities of the pseudo-random noise sequences as the spreading code at the time of transmitting the additional data using the TxID signals and maps the remaining additional data bits excluding one additional data bit from the plurality of additional data bits to the plurality of sequences and then transmits the sequences corresponding to the values of the input bits, thereby significantly increasing the data transmission rate of the large-capacity broadcasting data. In addition, the apparatus for transmitting data may modulate the additional data by adding a relatively simple hardware, thereby minimizing the increase in complexity of the system. An apparatus for receiving data in a communication system in accordance with an exemplary embodiment of the present invention will be described in more detail with reference to FIG. 3.

Figure 3:
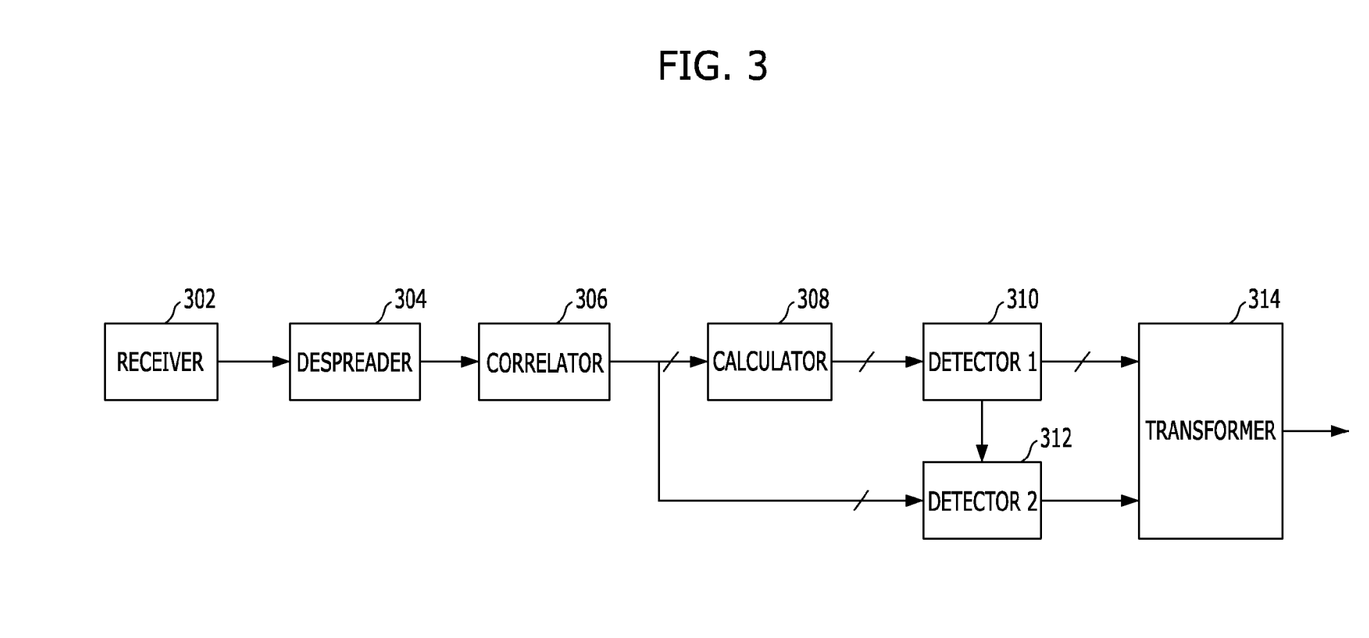
FIG. 3 is a diagram schematically illustrating a structure of a receiving apparatus in a communication system in accordance with an exemplary embodiment of the present invention.

FIG. 3 is a diagram schematically illustrating a structure of an apparatus for receiving data in a communication system in accordance with an exemplary embodiment of the present invention.

Referring to FIG. 3, an apparatus for receiving data includes a receiver 302 configured to receive broadcasting data for providing various types of high definition digital broadcasting to users, a despreader 304 configured to despread the additional data of the broadcasting data using the spreading code so as to demodulate the additional data in the received broadcasting data, a correlator 306 configured to correlate the despread additional data with the predetermined sequences, a calculator 308 configured to calculate absolute values of the correlation values output by the correlation of the correlator 306, a detector 1 310 configured to detect a maximum value from the absolute values of the correlation values calculated in the calculator 308, a detector 2 312 configured to detect polarity of the correlation values corresponding to the maximum values from the correlation values output by the correlation of the correlator 306, and a transformer 314 configured to transform the output bits from the detector 1 310 and the detector 2 312, that is, the additional data in the parallel type into the additional data in the serial type to output the additional data of the broadcasting data.

The despreader 304 despreads the additional data by multiplying the pseudo-random noise sequences as the spreading code by the additional data of the broadcasting data to despread the additional data. In this case, the despreader 304 may perform only the sign calculation depending on the signs of the pseudo-noise sequences to despread the additional data.

The correlator 306 correlates the additional data despread in the despreader 304 with M sequences, respectively, to calculates the correlation values. In this case, the correlator 306 may perform only the sign calculation depending on the signs of M sequences to calculate the correlation values of the additional data. Further, the correlator 306 outputs M correlation values which are input to the calculator 308 and the detector 2 312. Further, the correlator 306 may be implemented by fast Walsh transform when the sequence mappers 118 and 218 of the above-mentioned apparatus for transmitting data map the additional data using the Walsh sequence.

The calculator 308 calculates the absolute values of the correlation values of the additional data output from the correlator 306, respectively, that is, calculates the absolute values of the M correlation values. In this case, the calculator 308 calculates the M absolute values.

The detector 1 310 selects the indexes of maximum values from the M absolute values and outputs the selected indexes of maximum values to the detector 2 312. Further, the detector 1 310 outputs the sequence corresponding to the selected indexes of the maximum values, for example, the additional data mapped to M sequences to the transformer 314. Herein, the detector 1 310 outputs the additional data of ($\log_2$ M) bits mapped to the sequence corresponding to the selected indexes of maximum values. That is, the detector 1 310 outputs the remaining additional data bits of ($\log_2$ M) bits mapped by the sequence mappers 118 and 218 of the above-mentioned apparatus for transmitting data.

The detector 2 312 detects the polarities of the correlation values corresponding to the selected indexes of maximum values in the M correlation values and outputs the additional data corresponding to the detected polarities to the transformer 314. In this case, the detector 2 3122 outputs any one additional data bit used when the selectors 116 and 216 of the above-mentioned apparatus for transmitting data select the polarities in the pseudo-random noise sequences The transformer 314 transforms and outputs the remaining additional data bits of ($\log_2$ M) bits output from the detector 1 310 and one additional data bit output from the detector 2 312, that is, the additional data of ($\log_2$ M+1) in the parallel type into the additional data in the serial type. That is, the transformer 314 outputs the additional data transformed and demodulated into one additional data bit stream in a serial type.

The apparatus for receiving data in accordance with the exemplary embodiment of the present invention despreads the additional data by multiplying the pseudo-random noise sequence by the additional data transmitted using the TxID signals and then, calculates the despread additional data and the correlation values between the plurality of sequences, respectively to output the additional data corresponding to the maximum value of the absolute values and the polarities of the maximum value, thereby receiving the additional data through the TxID signals.

In other words, as described above, the apparatus for transmitting data transforms one of the plurality of additional data bits into the polarities of the pseudo-random noise sequences as the spreading code at the time of transmitting the additional data using the TxID signals and maps the remaining additional data bits excluding one additional data bit from the plurality of additional data bits to the plurality of sequences and then transmits the sequences corresponding to the values of the input bits, such that the above-mentioned apparatus for receiving data receives the additional data corresponding to the transmission of the apparatus for transmitting data, thereby significantly increasing the data transmission rate of the large-capacity broadcasting data. In addition, the apparatus for receiving data may demodulate the additional data by adding a relatively simple hardware, thereby minimizing the increase in complexity of the system. The additional data transmitting operation using the TxID signals of the apparatus for transmitting data in the communication system in accordance with the exemplary embodiment of the present invention will be described in more detail with reference to FIG. 4.

Figure 4:
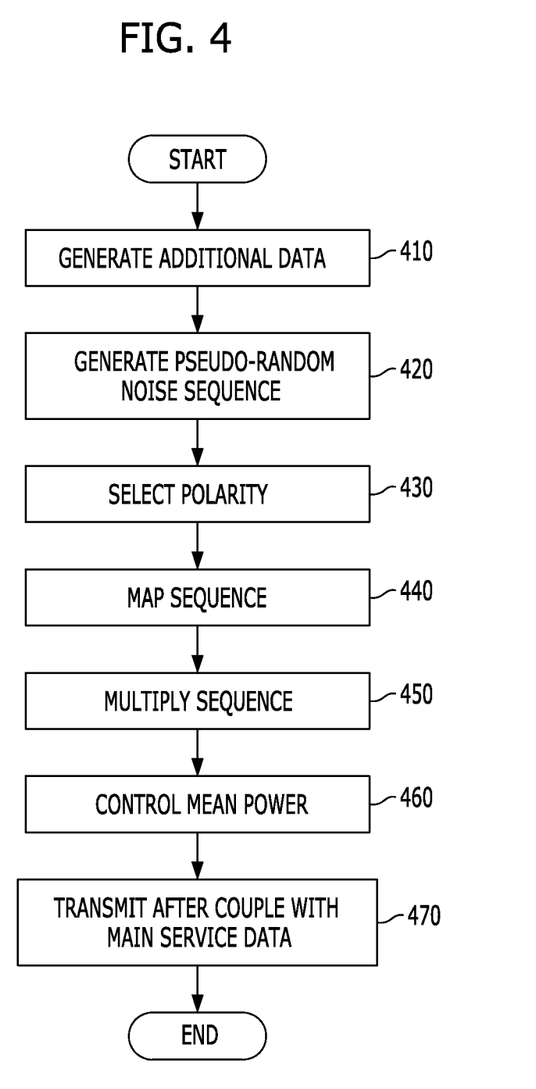
FIG. 4 is a diagram schematically illustrating an operational process of the transmitting apparatus in the communication system in accordance with the exemplary embodiment of the present invention.

FIG. 4 is a diagram schematically illustrating an operational process of the apparatus for transmitting data in the communication system in accordance with the exemplary embodiment of the present invention.

Referring to FIG. 4, at step 410, the apparatus for transmitting data generates the main service data of the broadcasting data as the main broadcasting services to be provided to the users and the additional data of the broadcasting data as the additional services to be additionally provided to the users in addition to the main broadcasting services. In this case, the additional data are transformed from data in the serial type into data in the parallel type.

At step 420, the pseudo-random noise sequence is generated as the spreading code to be used as the TxID signals so as to transmit the additional data using the TxID signals. Then, at step 430, the polarities of the pseudo-random noise sequences are selected by using any one additional data bit in the additional data in the parallel type.

Next, at step 440, the remaining additional data excluding any one additional data bit from the additional data in the parallel type are mapped to the single sequence. In this case, the Walsh sequence is used so as to perform the mapping of the remaining additional data.

Thereafter, at step 450, the pseudo-random noise sequences of which the polarities are selected are multiplied by the sequences mapped to the single sequence, that is, the sequences to which the remaining additional data are mapped. In this case, the transformation is performed so that the length of the pseudo-random noise sequences of which the polarities is the same as the length of the sequences to which the remaining additional data are mapped and then, both sequences are multiplied. In this case, only the sign transformation calculation may be performed depending on the mapped sequences or the pseudo-random noise sequences of which the polarities are selected.

At step 460, after the mean power of the additional data multiplied by the sequences is controlled, at step 470, the broadcasting data are transmitted by coupling the additional data of which the mean power is controlled with the main service data. The additional data receiving operation transmitted through the TxID signals of the apparatus for receiving data in the communication system in accordance with the exemplary embodiment of the present invention will be described in more detail with reference to FIG. 5.

Figure 5:
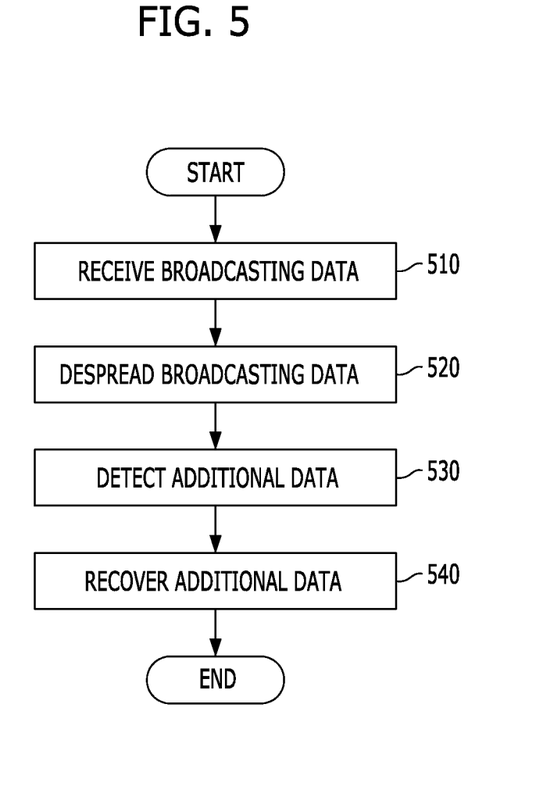
FIG. 5 is a diagram schematically illustrating an operational process of the receiving apparatus in the communication system in accordance with the exemplary embodiment of the present invention.

FIG. 5 is a diagram schematically illustrating an operational process of the apparatus for receiving data in the communication system in accordance with the exemplary embodiment of the present invention.

Referring to FIG. 5, at step 510, the apparatus for receiving data receives the broadcasting data for providing various types of high definition digital broadcasting to the users.

At step 520, in order to demodulate the additional data in the received broadcasting data, the additional data of the broadcasting data are despread using the pseudo-random noise sequences as the spreading code. In this case, the additional data are multiplied by the pseudo-random noise sequences to despread the additional data.

Next, at step 530, the additional data in the parallel type are detected in the despread additional data, at step 540, the additional data in the parallel type is transformed into the additional data in the serial type to recover the transmitted additional data using the TxID signals in the apparatus for transmitting data. In this case, after the despread additional data and the correlation values between the plurality of sequences are each calculated, the additional data corresponding to the maximum values of the absolute values of the correlation values and the additional data corresponding to the polarities of the maximum values are each detected and the detected additional data are transformed from the parallel type to the serial type, such that the apparatus for transmitting data is recovered to the transmitted additional data.

The exemplary embodiments of the present invention transmits and receives the additional data of the broadcasting data by using the transmitter identification signals so as to identify the plurality of transmitters present in the network in the communication system, thereby improving the data transmission efficiency and the use efficiency of frequency and minimizing the transmitting signal interference of the adjacent transmitters. Further, the exemplary embodiments of the present invention can smoothly transmit and receive the large-capacity broadcasting data and the additional data of the broadcasting data so as to meet the demands of the users wishing to receive various types of high definition digital broadcasting and thus, provide various types of high definition digital broadcasting to the users.

While the present invention has been described with respect to the specific embodiments, it will be apparent to those skilled in the art that various changes and modifications may be made without departing from the spirit and scope of the invention. Accordingly, the scope of the invention is not limited to exemplary embodiments as described above and is defined by the following claims and equivalents to the scope the claims.

What is claimed is:

1. An apparatus for transmitting data in a communication system, comprising:
a first generator configured to generate main service data of broadcasting data;
a second generator configured to generate additional data of the broadcasting data;
a transformer configured to transform the addition data into a parallel type;
a sequence generator configured to generate pseudo-random noise sequences as a spreading code of the additional data;
a selector configured to select polarities of the pseudo-random noise sequences using any one additional data bits in the additional data in the transformed parallel type;
a sequence mapper configured to map the remaining additional data bits excluding the one additional data bit from the additional data in the transformed parallel type to a single sequence;
a multiplier configured to multiply a single sequence to which the remaining additional data bits are mapped by pseudo-noise sequences of which the polarities are selected;
a controller configured to control mean power of the additional data multiplied by the sequences;
a coupler configured to couple the additional data of which the mean power is controlled with the main service data as the broadcasting data; and
a transmitter configured to transmit the broadcasting data.

2. The apparatus of claim 1, wherein the pseudo-random sequence is used as a transmitter identification (TxID) signal of the apparatus for transmitting the broadcasting data.

3. The apparatus of claim 1, wherein the sequence mapper maps the remaining additional data bits to the single sequence of the plurality of sequences corresponding to the remaining additional data bits.

4. The apparatus of claim 1, comprising:
a first modulator configured to modulate the main service data into a first frequency band; and
a second modulator configured to modulate the additional data multiplied by the sequences into a second frequency band.

5. The apparatus of claim 1, comprising a modulator that modulates the broadcasting data coupled in the coupler into the predetermined frequency band.

6. The apparatus of claim 1, wherein the multiplier transforms the single sequence to which the remaining additional data are mapped to have the same length as the pseudo-random noise sequences of which the polarities are selected and then, multiplies both sequences.

7. The apparatus of claim 1, wherein the multiplier performs sign transformation calculation depending on signs of a single sequence to which the remaining additional data bits are mapped or signs of the pseudo-random noise sequences of which the polarities are selected to output the additional data multiplied by the sequences.

8. An apparatus for receiving data in a communication system, comprising:
a despreader configured to multiply and despread pseudo-random noise sequences as a spreading code by additional data of broadcasting data;
a correlator configured to correlate the despread additional data with a plurality of sequences to calculate a plurality of correlation values;
a calculator configured to calculate absolute values of the correlation values, respectively;
a first detector configured to select indexes of maximum values among the absolute values and output additional data bits corresponding to the indexes;
a second detector configured to detect polarities of the correlation values corresponding to the indexes from the plurality of correlation values and output the additional data bits corresponding to the detected polarities; and
a transformer configured to transform additional data bits output from the first detector and the second detector in to additional data in a serial type and recover the additional data of the broadcasting data.

9. The apparatus of claim 8, wherein the first detector outputs the additional data bits mapped to the plurality of sequences corresponding to the indexes, and the second detector outputs one additional data bit corresponding to the detected polarities.

10. The apparatus of claim 8, wherein the despreader performs sign transformation calculation depending on signs of the pseudo-random noise sequences to output the despread additional data; and
the correlator performs the sign transformation calculation depending on the signs of the plurality of sequences to calculate the plurality of correlation values.

11. A method for transmitting data in a communication system, comprising:
generating main service data of broadcasting data and additional data of the broadcasting data and transforming the additional data into a parallel type;
generating pseudo-random noise sequences as a spreading code of the additional data;
selecting polarities of the pseudo-random noise sequences using any one additional data bits in the additional data in the transformed parallel type;
mapping the remaining additional data bits excluding the one additional data bit from the additional data in the transformed parallel type to a single sequence;
multiplying a single sequence to which the remaining additional data bits are mapped by pseudo-noise sequences of which the polarities are selected;
controlling mean power of the additional data multiplied by the sequences; and
coupling the additional data of which the mean power is controlled with the main service data and then, transmitting the broadcasting data.

12. The method of claim 11, wherein the pseudo-random sequence is used as a transmitter identification (TxID) signal of the apparatus for transmitting the broadcasting data.

13. The method of claim 11, wherein the mapping maps the remaining additional data bits to the single sequence of the plurality of sequences corresponding to the remaining additional data bits.

14. The method of claim 11, wherein the multiplying transforms the single sequence mapped by the sequence mapper to have the same length as the pseudo-random noise sequences of which the polarities are selected and then, multiplies both sequences.

15. The method of claim 11, wherein the multiplying performs sign transformation calculation depending on signs of a single sequence to which the remaining additional data bits are mapped or signs of the pseudo-random noise sequences of which the polarities are selected to output the additional data multiplied by the sequences.

16. A method for receiving data in a communication system, comprising:
multiplying and despreading pseudo-random noise sequences as a spreading code by additional data of broadcasting data;
after correlating the despread additional data with a plurality of sequences to calculate a plurality of correlation values and calculating absolute values of the correlation values, respectively, selecting indexes of maximum values among the absolute values to detect additional data bits corresponding to the indexes, detecting polarities of the correlation values corresponding to the indexes from the plurality of correlation values and detecting the additional data bits corresponding to the detected polarities; and
transforming the respective detected additional data bits into one additional data in a serial type to recover the additional data of the broadcasting data.

17. The method of claim 16, wherein the detecting detects the additional data bits mapped to the plurality of sequences corresponding to the indexes and detects one additional data bit corresponding to the detected polarities.

18. The method of claim 16, wherein the dispreading calculates sign transformation calculation depending on signs of the pseudo-random noise sequences to despread the additional data; and
the detecting performs the sign transformation calculation depending on signs of the plurality of sequences to calculate the plurality of correlation values.

* * * * *